No. 706,442. Patented Aug. 5, 1902.
A. & J. H. McLEOD.
AUTOMATIC GRAIN WEIGHER.
(Application filed Aug. 17, 1901.)

(No Model.) 6 Sheets—Sheet 1.

WITNESSES:
Jos. A. Ryan
Amos W. Hart

INVENTORS
Angus McLeod
John H. McLeod
BY
Munn & Co.
ATTORNEYS

No. 706,442. Patented Aug. 5, 1902.
A. & J. H. McLEOD.
AUTOMATIC GRAIN WEIGHER.
(Application filed Aug. 17, 1901.)
(No Model.) 6 Sheets—Sheet 2.
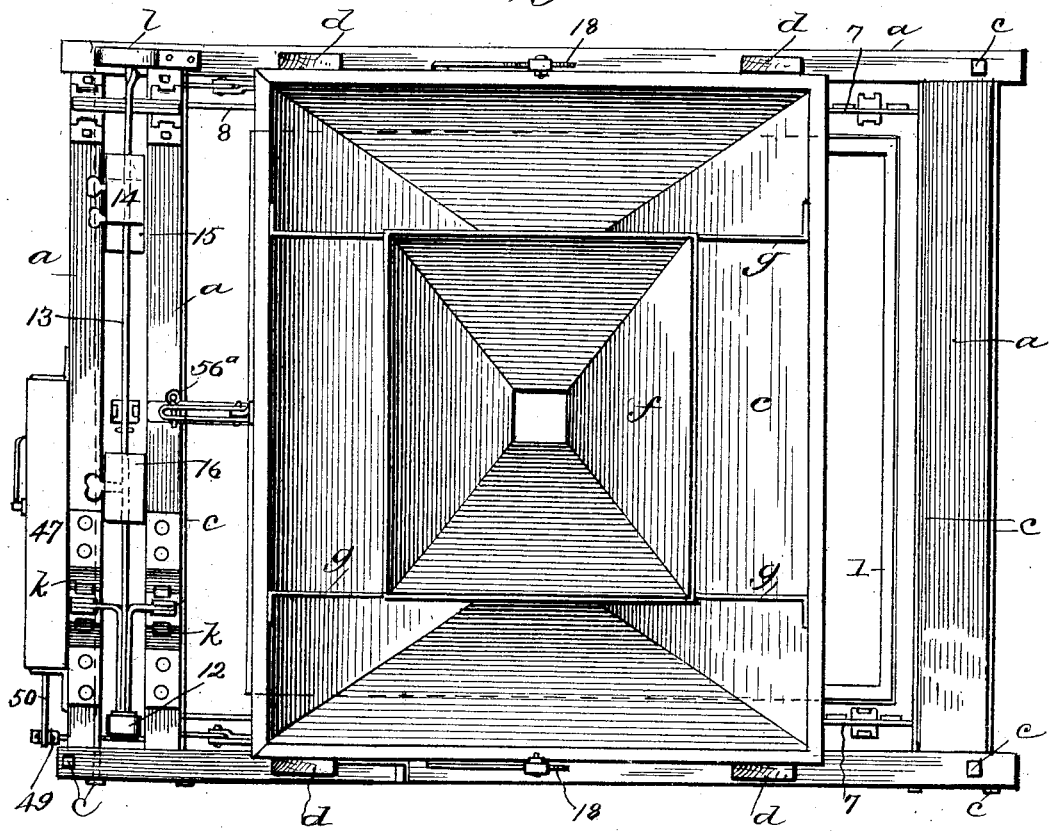
WITNESSES:
INVENTORS
Angus McLeod
John H. McLeod
BY
ATTORNEYS

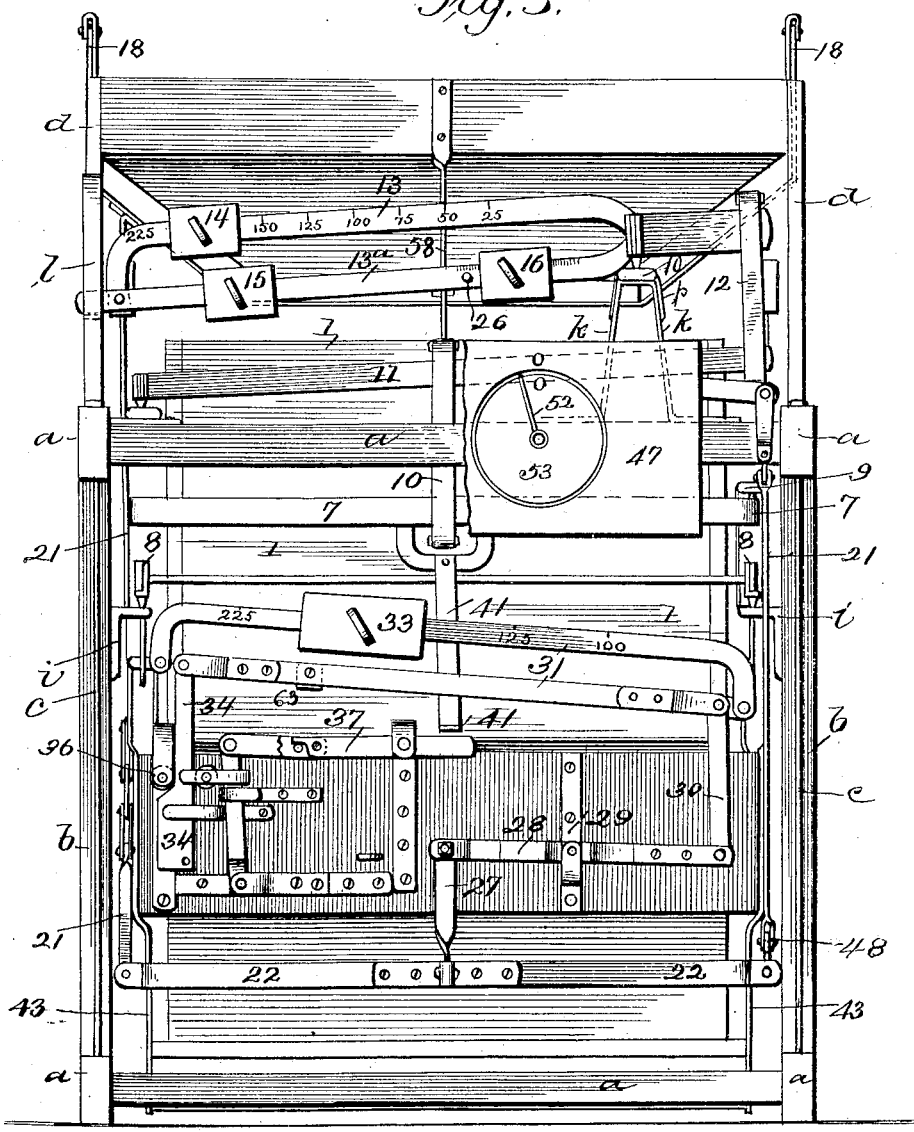

No. 706,442. Patented Aug. 5, 1902.
A. & J. H. McLEOD.
AUTOMATIC GRAIN WEIGHER.
(Application filed Aug. 17, 1901.)
(No Model.) 6 Sheets—Sheet 4.

WITNESSES:
INVENTORS
Angus McLeod
John H. McLeod.
BY
ATTORNEYS

No. 706,442. Patented Aug. 5, 1902.
A. & J. H. McLEOD.
AUTOMATIC GRAIN WEIGHER.
(Application filed Aug. 17, 1901.)
(No Model.) 6 Sheets—Sheet 5.
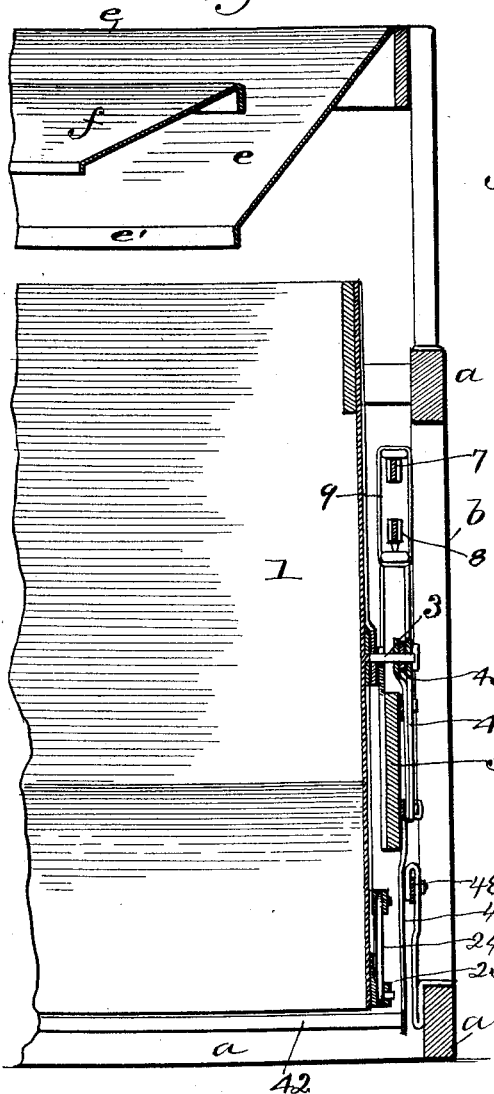
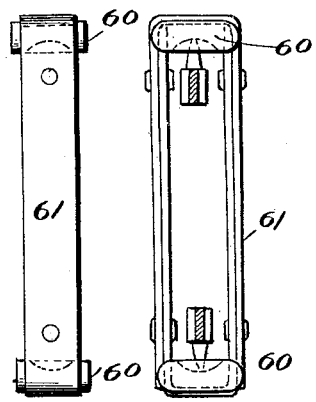
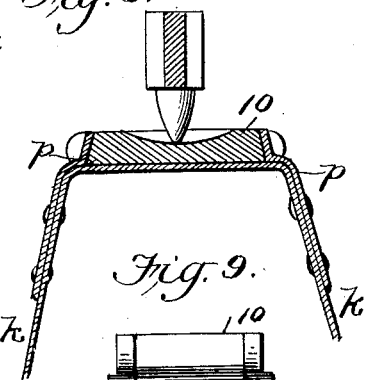
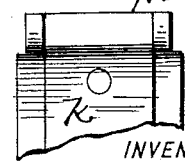
WITNESSES:
Jos. A. Ryan
Amos W Hart
INVENTORS
Angus McLeod
John H. McLeod
BY Munn & Co.
ATTORNEYS.

No. 706,442. Patented Aug. 5, 1902.
A. & J. H. McLEOD.
AUTOMATIC GRAIN WEIGHER.
(Application filed Aug. 17, 1901.)

(No Model.) 6 Sheets—Sheet 6.

WITNESSES:
Jas. A. Ryan
Amos W Hart

INVENTORS
Angus McLeod
John H. McLeod
BY
Munn & Co,
ATTORNEYS

UNITED STATES PATENT OFFICE.

ANGUS McLEOD AND JOHN H. McLEOD, OF MARIETTA, KANSAS.

AUTOMATIC GRAIN-WEIGHER.

SPECIFICATION forming part of Letters Patent No. 706,442, dated August 5, 1902.

Application filed August 17, 1901. Serial No. 72,375. (No model.)

*To all whom it may concern:*

Be it known that we, ANGUS McLEOD and JOHN H. McLEOD, citizens of the United States, residing at Marietta, in the county of Marshall and State of Kansas, have made certain useful Improvements in Automatic Grain-Weighers, of which the following is a specification.

It is the object of our invention to provide an improved automatic grain-weigher of that class in which the grain is received into a stationary hopper and discharged therefrom into a movable weighing hopper or bucket which is so connected with a graduated weighing-beam as to tilt the latter when duly filled, whereupon the valve or gate of the weighing-hopper is opened to allow discharge of the contents.

Our invention comprises improvements in the receiving-hopper, the weighing-hopper, the means for cutting off the discharge of grain into the weighing-hopper, in the gates or closures for the weighing-hopper, in the means for recording the weight of the grain received by the weighing-hopper, and in other features, as will be hereinafter set forth.

The details of construction, arrangement, and operation are as hereinafter set forth, reference being had to the accompanying drawings, in which—

Figure 1:
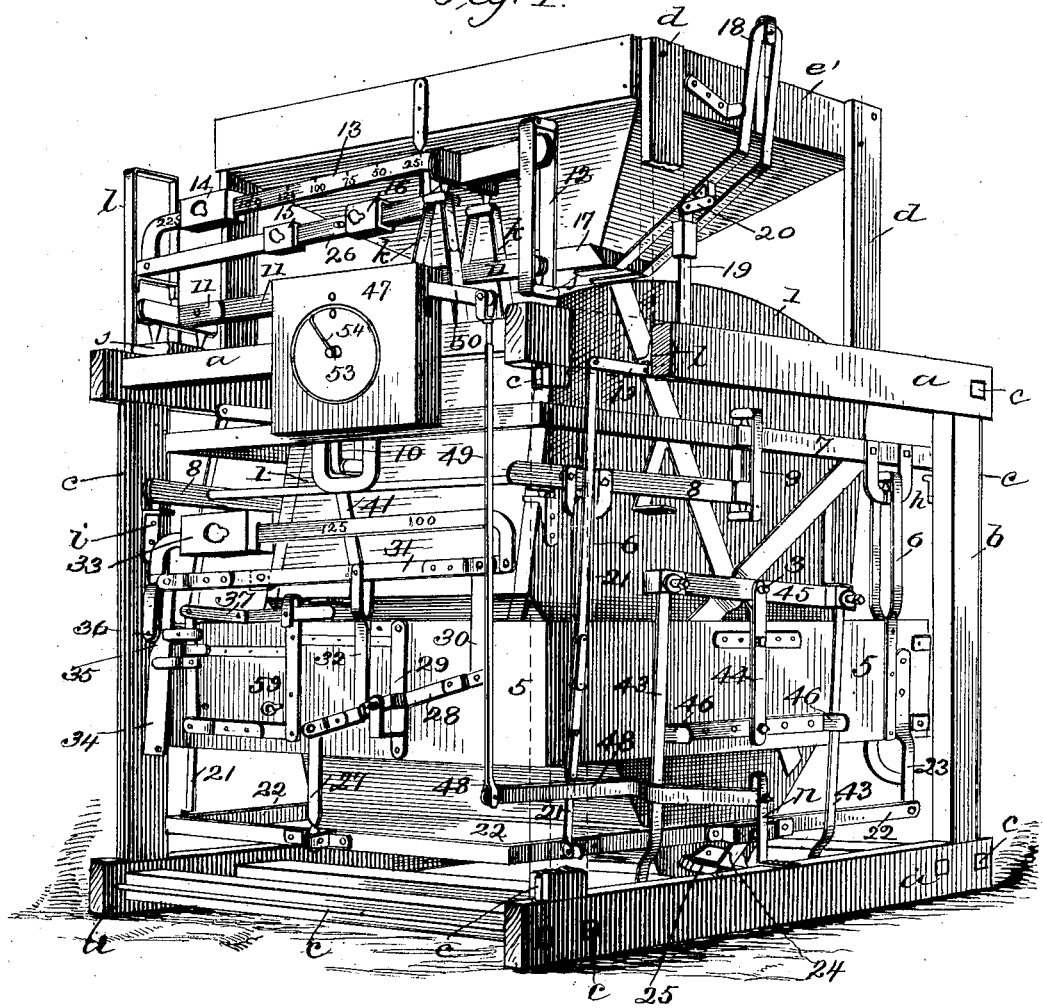
Figure 13:
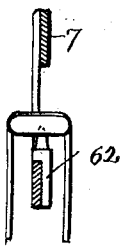
Figure 4:
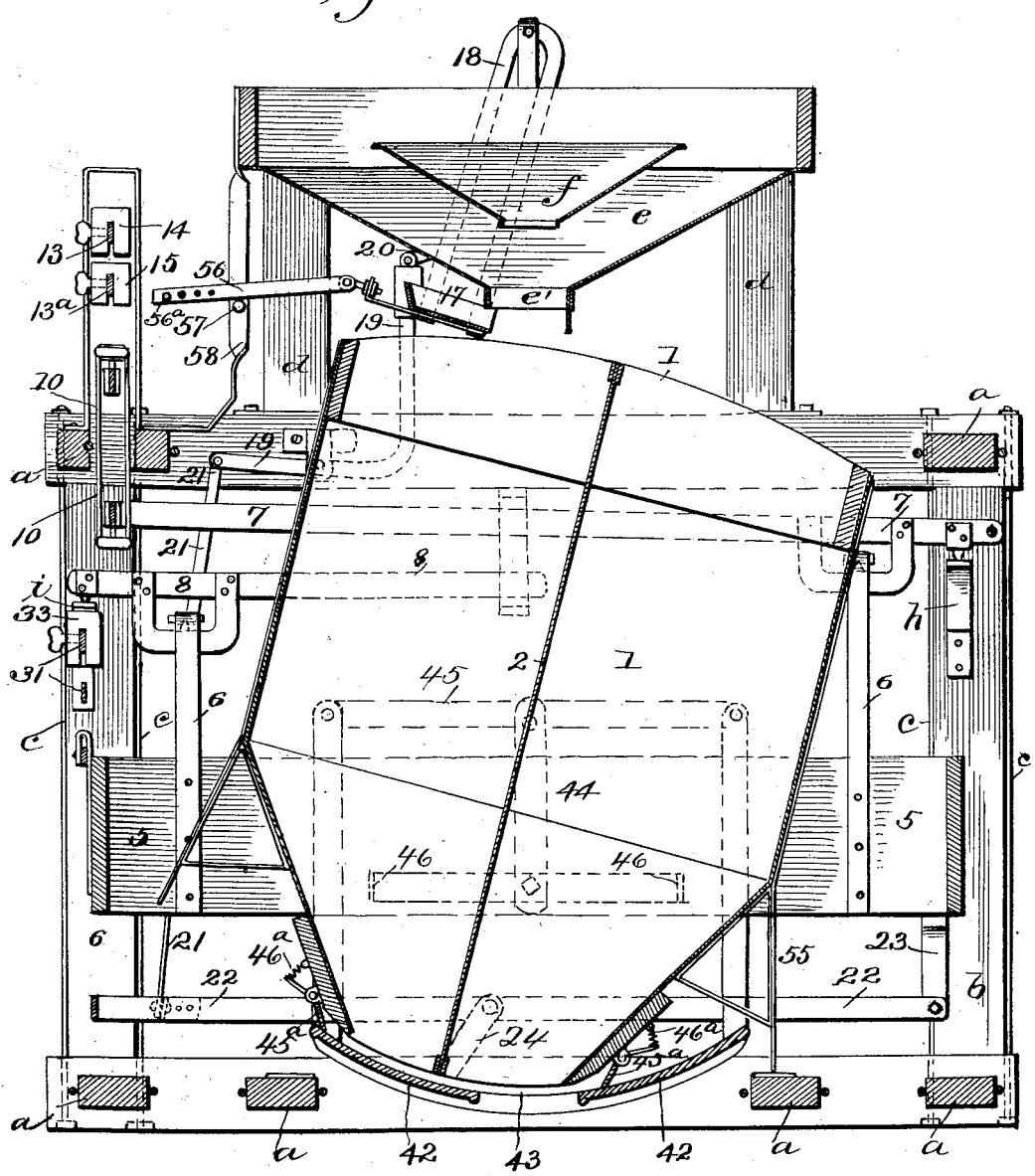
Figure 10:
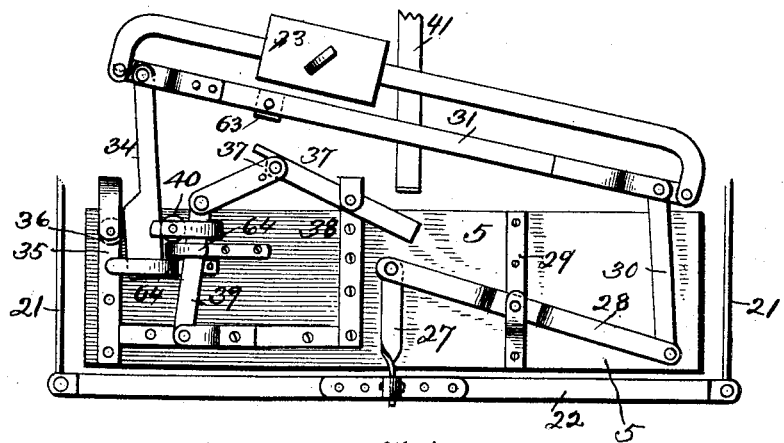
Figure 11:
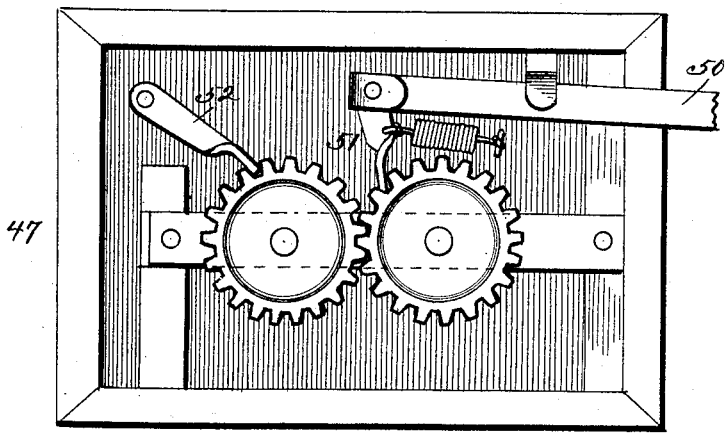
Figure 12:

Figure 1 is a perspective view of our improved machine. Fig. 2 is a plan view of the same. Fig. 3 is a front elevation. Fig. 4 is a central vertical section. Fig. 5 is a vertical section of a portion of the apparatus, taken at right angles to the section shown in Fig. 4. Figs. 6 and 7 are side and sectional views of the stirrups or hangers connecting the weighing-levers. Fig. 8 is a detail section illustrating a bearing for a weighing-lever. Fig. 9 is a side view of a portion of the bearing or bracket. Fig. 10 is a front view of a portion of the apparatus, illustrating the position of locking mechanism different from that represented in Fig. 3. Fig. 11 is a face view of the recording mechanism. Fig. 12 is a horizontal section of the same. Fig. 13, Sheet 1, is a sectional detail of a bearing for the weighing-levers.

In the following description the fixed or stationary parts will be indicated by lower-case letters and the movable parts by numerals.

The main frame of the machine is rectangular and composed of horizontal top and bottom bars $a$, vertical bars $b$, and tie-rods $c$, which are inserted through the ends of the horizontal bars $a$ and provided with screw-nuts, whereby they are adapted to hold the parts $a\ b$ of the frame firmly connected. By this construction we provide a frame having maximum lightness, strength, and rigidity and in which compensation for shrinkage may be made as occasion requires. Upon the frame $a\ b$ are supported uprights $d$, which support the grain-receiving hopper $e$. As shown best in Fig. 2, this hopper is rectangular in its horizontal form and tapers toward the bottom. Within it is arranged a second hopper $f$, which has a similar form and is made of about one-third its size. The hopper $f$ is supported by cross-bars $g$, attached to the upper part of the larger receiving-hopper $e$. As shown in Fig. 4, the smaller hopper $f$ is arranged about half-way between the top and bottom of the receiving-hopper $e$ and is separated from the latter by a space which allows overflow of the grain in case the discharge capacity of the small hopper is exceeded. Its function is to prevent the too rapid descent of grain into the receiving-hopper and therefrom into the weighing-hopper 1, arranged below. In other words, its function is to break the force of gravity to a certain degree and by limiting or partly arresting the flow of grain as received from a chute or trough (not shown) to cause it to overflow into the receiving-hopper $e$, and thereby descend more gently into the weighing-hopper 1.

The weighing-hopper 1 is divided centrally and vertically by a partition 2, whereby two equal-size compartments are formed, as shown in Fig. 4. The said hopper is pivoted near the middle of two opposite sides by means of short journals or gudgeons 3. (See Figs. 1 and 5.) These gudgeons 3 have their bearings in vertical bars 44, attached to opposite sides of a wooden frame 5, and are set or held fixed in diagonal iron bars secured to the sides of the hopper 1. It is apparent that the weight of the frame 5 must be accounted for or balanced along with that of the hopper 1.

The frame 5 is suspended by means of four hangers 6, arranged near its corners, from two primary weighing beams or levers 7 and 8. The longer lever 7 is pivoted on brackets $h$, attached to the rear vertical bars $b$ of the fixed frame and extend around the front side of the weighing-hopper 7. The shorter weighing-levers 8 are similarly pivoted on brackets $i$, attached to the front vertical bars $b$ of the stationary frame, and their inner or free ends rest in stirrups 9, which depend from the central portions of the longer levers 7. The front portion of the levers 7 is connected by hanger 10 (see Figs. 3 and 4) from a lever 11, having pivoted bearings at $j$ on the front upper horizontal bar $a$ of the fixed frame. The free end of said lever 11 rests in a stirrup 12, which connects it with the shorter arm of the double weighing-lever proper, 13. The latter is pivoted at two points (see Fig. 1) on vertical brackets $k$, secured upon the fixed frame $a$, and the free end of the said lever is free to vibrate in a stationary loop or keeper $l$. The pivots of the beam are separated widely and seated in circular cups or sockets, so that torsion of the beam is prevented without friction. The pivot on the shorter arm and upper side of the beam 13 being higher than the fulcrum-pivots gives a gain in leverage, which facilitates the working of the apparatus. This compound weighing-lever 13 is provided with three slidable weights, as shown. The weight 14 is applied to the upper graduated bar or weighing-beam proper and is adjustable or slid along the beam to regulate the quantity of grain which the hopper 1 shall alternately receive and discharge.

The lower portion of parallel bar $13^a$, constituting part of the weighing-beam, is provided with two weights 15 and 16. The weight 15 is used for balancing the hopper and other parts, as required, prior to beginning the weighing operation. The weight 16 is for the purpose of adjusting the cut-off for the receiving-hopper, as will be described hereinafter, or rather to regulate the weight of the portion of the grain which last enters the hopper, as will be further explained. It will be understood that in weighing grain delivered in a continuous stream more would run into the weighing-hopper 1 after enough has entered the same to trip the scale or weighing-beam and that this portion would be in excess of the true weight required. It is therefore necessary to cut off the flow of grain in part just prior to the complete cut off. For this purpose we employ the device 17, (see Figs. 1 and 4,) which consists of a pan or tray suspended by pivoted hangers 18 and adapted to swing under the discharge-outlet $e'$ of the receiving-hopper $e$. It is apparent that if this tray be adjusted as shown in Fig. 4 the opening $e'$ will discharge to its full capacity; but by adjusting the device 17 to cover more or less of said opening the discharge will be cut off correspondingly. Elbow-levers 19, which are suitably provided with weights, are pivoted at $l$ near their angles to the upper horizontal bars $a$ of the stationary frame and connected at their upper ends by links 20 with the hangers 18, before referred to. A jointed bar or rod 21 connects the horizontal arm of each of these elbow-levers 19 with a lever 22, which is arranged in the lower portion of the frame $a\ b$ and pivoted to bars 23, which are pendent from a movable frame 5. It will now be seen that if the free end of said lever 22 be raised it will allow the upper weighted ends of the elbow-levers 19 to fall to the right (see Fig. 1) and carry with them the tray or cut-off 17. This operation is effected—that is to say, the cut-off is operated at the proper times—through the vertical lifting of the lever 22 by means which will now be described. As shown in Fig. 1, a toggle-bar 24 is pivoted to the lever 22 and also to a slotted keeper 25, secured to the side of the weighing-hopper 1. It will be understood that this arrangement is duplicated on the opposite side of the machine. In fact, the two sides of the machine referred to are duplicates in all respects.

It will be understood that the hopper 1 has two movements—namely, a downward movement, due to the shifting of the frame 5 and weighing-levers 7 and 8 when one compartment of the hopper is filled with grain, and an oscillating or rotary movement on its trunnions or pivots 3. The hopper is shown in Figs. 1 and 4 as inclined to the left at its lower part, its left compartment being thus closed at the bottom and in position to receive grain from the fixed hopper $e$. When now the left compartment has nearly filled, the weight of the grain thus received by it will cause the hopper to make a preliminary shift or movement on its pivots to the right, and this will carry the lower end of toggle-lever 24 to the right, so that the latter will apply upward pressure on the horizontal lever 22, and thereof raise the latter a very short distance, but far enough to slacken the link-rod 21 and allow the elbow-levers 19 to shift the cut-off as required to arrest the flow of grain, as described. The arrangement is such that about eighty to ninety per cent. of the grain required to fill one of the compartments of the weighing-hopper 1 is allowed to flow in the same before the cut-off is operated. In other words, the cut-off operates when the hopper compartment is filled to within twenty to forty pounds of the amount it is required to weigh. The weight 33 on bar 31 is adjusted to regulate this. To prepare the scale for balancing, move weight 16 against pin 26, also move weight 14 to the right as far as it will go on beam 13, then move weight 15 on bar $13^a$ until the beam will tilt slowly, which indicates the scale is balanced. The key or pin $56^a$, Fig. 4, is also inserted in fourth hole in bar 56 to get slack in jointed rod 21, as required for balancing. For weighing grain flowing in a continuous stream, move weight 16 seven pounds to the right—i. e., more or less to the right to suit the adjustment of the tray 17. If the dribble-stream be made smaller, it will require less than seven pounds; if larger, more than seven pounds. Now to weigh two hundred pounds we move weight 14 on beam 13 to the mark indicating that amount. The weight 33, Fig. 3, is moved to mark "200" on beam 31. This beam is not graduated in pounds, but merely to show where to place the weight 33. Now when two hundred pounds of grain shall have run into the hopper the beam 13 will be tilted, which will lower the bar 41 until it strikes upon and trips the toggle-lever 37, whereupon the hopper 1 is allowed to turn so as to discharge its load and at the same time place the previously empty compartment in position to receive a load. Now if we were weighing a continuous stream some more grain would enter the one compartment of hopper 1 while the latter moves, and the weight of the grain so received will depend upon the adjustment of the tray 17. We will suppose that it is seven pounds. Now instead of having two hundred pounds, as indicated by the figures on the beam, we have two hundred and seven pounds, seven pounds having entered the hopper after the toggle-lever 37 was tripped. To prevent this, we have graduated a part of the beam to the right of pin 26 and placed weight 16 thereon. If there is an excess of seven pounds, we move weight 16 to the seven-pounds mark on the right. The toggle-lever 37 will now be tripped at one hundred and ninety-three pounds, and seven pounds will enter while hopper 1 is moving, so as to substitute the empty for the loaded compartment, making two hundred pounds, as indicated on the beam. Tray 17 is adjusted at the factory, so that it is not at all likely that it will ever be necessary to change it. If, however, it should be necessary to increase the handling capacity of the scale, we do so by adjusting tray 17 for a larger dribble-stream.

It is also to be understood that when the amount of grain in the compartment being filled reaches to within twenty to forty pounds of the weight required the hopper 1 will make a preliminary movement or shift on its axis sufficiently to cause the toggle-bar 24 to raise the lever 22, and thereby cause the cut-off 17 to operate, as before described. This cut-off therefore reduces the discharge of the receiving-hopper e to a dribble or small stream.

It is obvious that the point at which the cut-off may be made to operate may be changed by shifting the weight which sits on the bar 31. After the hopper 1 has made its initial movement it stands from five to eight seconds before making its final movement.

It is required to provide a temporary lock for the hopper 1 to arrest it and prevent its making the complete movement. For this purpose we employ the mechanism now to be described. As shown in Figs. 1 and 10, the cut-off lever 22 is connected by a link 27 with a short lever 28, pivoted to a bracket 29, secured to the front side of the frame 5, and the right end of this lever 28 is connected by a link 30 with the right end of a double lever 31, which is pivoted upon a bracket 32, likewise secured to the aforesaid frame 5. The upper portion of this lever is a graduated bar upon which is arranged to slide a weight 33, which in practice requires to be set at the same number as the weight 14 on the weighing-bar 13, before described. From the left-hand end of the double lever 31 depends a pivoted stop-bar 34, which is broadest in its lower portion and provided with a beveled or inclined shoulder 35. The attachment of the bars 30 and 34 to the lower bar of lever 31 is effected by pivoting them to brackets or laterally-curved plates riveted to such bar adjacent to its ends. It will now be understood that when the weighing-hopper 1 makes its preliminary shifting movement and operates the cut-off 17, as before described, by the same upward movement of the lever 22 the short lever 28 is tilted and the right-hand end of the long double lever 31 thereby drawn down correspondingly. This will obviously raise the stop-bar 34, and in such case its beveled shoulder 35 comes in contact with a fixed stop 36, consisting of an antifriction-roller. This engagement is shown in Fig. 1, the bar 34 being held in such locking contact by means of the pressure applied through a toggle-lever 37. One of the two parts of this lever is pivoted to a bracket 38 on the frame 5, and the other is pivoted to a bar 39, which is also pivoted on the frame 5 and adapted to swing in a vertical frame. This swinging bar 39 carries a roller 40, that works in contact with the straight side of the stop-bar 34. One of the bars composing the toggle-lever 37 is provided with a toe or extension, (see Fig. 10,) which prevents the pivot of the same falling below the horizontal. It is apparent that the bar 34 by contact with the roller 36 will lock the lever 31 and limit its upward movement through the pivotal-bar connections between the lever 31, and by the lever 22, to which the toggle-bar 24 is pivoted, the hopper 1 will be held fixed in place after its preliminary shift or movement, and to release the hopper, so that it can complete its oscillating movement, as required for discharge of the loaded compartment and for reception of grain in the empty one, it is requisite that the lock be released—that is to say, that the bar 34 be allowed to move upward freely. It is effected by the depression of the primary weighing-lever 7, which carries a pendent arm 41, having its lower end bent outward, whereby it is adapted for contact with the outer end of one of the bars composing the toggle-levers 37. Thus when the hopper is filled with two hundred pounds of grain or with any other amount for which the apparatus is set it depresses and carries down the levers 7 and 8, which, acting upon the weighing-beam 13 through the medium of the stirrup 10, lever 11, and stirrup 12, (see Fig. 3,) tips the weighing-beam 13 or raises its longer arm to the limit allowed by the guide or loop $l$, and in this movement the arm 41 trips the toggle-lever 37, whereby the roller 40 is drawn back, as shown in Fig. 10, and the stop-bar 34 is thereby released and slides upward, so that the lever 22 is raised and the toggle-bar 24 allows the hopper to shift as required to effect discharge of the grain.

As shown best in Fig. 4, the mouth of the compartments of the hopper 1 is closed by means of gates or valves 42, which are separated by slot 43, through which the grain discharges, and are curved upon the arc of the circle concentric with the pivots of the hopper 1. It is apparent that if these gates or valves were fixed in place and the hopper were caused to slide over them in making its oscillating movements considerable friction would result and that the accuracy of the machine would be impaired. We have therefore devised an arrangement whereby said gates or valves 42 shall shift or move with the hopper in its first movement, whereby the discharge of grain is partially arrested and reduced to a dribble. As shown in Fig. 1, the gates are supported by and rigidly connected to bars or hangers 43, which are pivoted to the ends of a horizontal walking-beam 45, and the latter is hung on the pinions or trunnions 3 of the hopper. Stops 46 are arranged at a lower point on the movable frame 5 to limit the inward movement of hangers 43. The valves 42 shift with the hopper 1 in its initiatory movement. When the stop or locking bar 34 is released and allowed to slide upward, as before described, the loaded compartment will move off a valve 42, whose further movement is then arrested by one of the stops 46, and the mouth of such compartment will come over or register with the discharge-slot 43, and the contents of such compartment will be immediately discharged. In the same movement the mouth of the previously empty compartment will move over or upon the opposite gate or valve 42 and be thereby closed, so that it will be ready to receive the grain.

In place of allowing the lower end of the hopper 1 to have immediate contact with the gates or valves 42 we reduce the friction by providing a very small space between them, as shown in Fig. 4, and by arranging the valves or scrapers 45$^a$ (see Fig. 4) exterior to the mouth of the hopper, as shown. The said scrapers are narrow plates of any suitable material whose lower edges work in sliding contact with the upper sides of the valves or gates 42. They are pivoted at their upper edges to the hopper 1 and provided with arms or extensions, to which spiral springs 46$^a$ are attached for holding the scrapers in elastic and easy contact with the gate. By this means one of the gates is cleaned of grain at each oscillation of the hopper 1 and friction is reduced to a minimum.

The cut-off for lever 22 has a third function in addition to those before described, it being adapted to operate a register 47, which is attached to the front upper horizontal bar of the fixed frame. The same is operated through the medium of a lever 48 (see Fig. 1) and a rod 49, that connects it with the lever 50 of the register proper. The said lever 48 is pivoted to a bracket $n$, attached to the lower horizontal bar of the fixed frame and extended forward over the cut-off lever 22, so that it is operated—that is, raised—by the latter whenever the hopper 1 makes its shifting movement. Thus the register-lever 50 is raised each time a hopper-compartment is filled and discharged. As shown in Figs. 11 and 12, a spring-pawl 51 is pivoted to the lever 50 within the case of the register and engages one of four meshing gears. An opposite gear is provided with a dog 52 to prevent backward rotation. It is unnecessary to describe this register in detail, since we propose to make it the subject of a separate application, and we propose to employ any suitable register which may be operated through the medium of a lever 50, arranged as shown. The register is provided with a dial 53, having a pointer 54.

The oscillating or tilting movement of the weighing-hopper 1 is arrested by means of stops 55, (see Fig. 4,) which consist of angle bars or legs suitably braced and attached to the tapered portion of the hopper on each side, their length and arrangement being such that they are adapted to strike upon horizontal bars $a$ of the fixed frame. It will be understood that this contact occurs when the hopper 1 has made a complete oscillation or has reached the position required to allow discharge of the loaded compartment and to bring one of the gates or valves 42 beneath the other compartment, so as to close it, as shown. Thus the stop-bar 34 and connecting mechanism arrest the hopper 1 in its prior and partial tilting movement, while the stops 55 arrest it upon making its complete movement. The cut-off 17, whereby the discharge of the receiving-hopper may be reduced to a dribble, as already explained, requires to be adjusted according to the kind of grain which is being weighed—that is to say, wheat requires a smaller opening than corn for discharge from the hopper $e$, and corn requires a smaller one than oats. To provide for the required adjustment of the cut-off 17, we attach to it a bar 56, (see Fig. 4,) which is supported in a horizontal position by means of lateral pins 57, fixed in a vertical bar 58. The outer or left-hand end of the bar 56 is provided with a series of holes. Now if it be desired to weigh wheat or rye a spring-pin 56$^a$ (see Fig. 2) is placed in the outer hole, while for corn it is placed in the second hole, and for oats in the third. A fourth hole may be provided for the pin for the purpose of holding the cut-off 17 open while balancing the scale. As shown in Fig. 1, the jointed rod 21 is straight, and the key 56ª is in the outer hole in bar 56. When we wish to get slack in rod 21 for balancing the hopper, we put the key 56ª in the fourth hole. The lever 31 is then in the position indicated in Fig. 3. This pin when not in use is inserted in a hole in the front side of the frame 5; but for locking the weighing-hopper it is inserted through the hole in the lower end of the stop-bar 34 and a coincident hole provided in the frame 5.

We will now refer to and sufficiently describe certain details in the general structure of the machine. As shown best in Figs. 6 and 7, the hangers or stirrups employed for connecting two parts or weighing-levers are formed by means of two bearing-blocks 60, having conical recesses, and two clevis-like loops 61. It will be seen that one of such loops passes around the outer side of a bearing-block 60 and the other around the opposite block 60 and that one of said loops is made slightly larger than the other, so as to receive it, as shown. The parallel bars or side parts of these loops lie in contact and are riveted together, as shown. By this means a very strong but light hanger or stirrup is produced. The pivot-bearings of the levers are conical pins which seat in the concave recesses formed in the bearing-blocks.

In the form of bearings shown in Figs. 1 and 9 a bracket or standard $k$ supports a bearing-block 10, the latter being held in place between side plates $p$, whose upper edges embrace its beveled sides, as shown.

It will be observed that the fixed brackets $h$ and $i$ and others are provided with a conical recess adapted to receive the pivot-pins.

In Fig. 13, Sheet 1, we illustrate the attachment of a pivot-pin 62 to a lever, the same being cut away to form a shoulder, whereby it is adapted to overlap the bar to which it is riveted. This fastening is very strong and secure and involves minimum weight of material.

From Figs. 1 and 2 it will be observed that the weighing-beam proper, 13, and the connected weighing-bar 11, arranged below it, are both provided with two pivot-bearings, whereby they are held firm and steady without danger of torsion or lateral oscillation. In Fig. 10 the toggle-lever 37, whereby the stop-bar 34 is held locked up to a certain time and then released, is restored positively to its original straight-line position by means of a contact-piece 63, attached to the lower bar 31 in such position that when the latter descends the part 63 will strike upon the finger or projecting portion of the toggle-lever at the joint thereof and depress it to its normal position. As shown in Figs. 3 and 10, suitable keepers or guides 64 are provided for the stop-bar 34 and the toggle-supporting bar 39.

The operation of the machine as a whole may be briefly restated as follows: The cut-off 17 having been retracted and secured in proper position by a pin and the stop-bar 34 having been raised and secured by the pin 59 to hold the weighing-hopper vertical, the latter and its attachments are balanced by adjustment of the weight 15 on the portion 13ª of the weighing-beam, the weights 14 and 16 having been previously adjusted as required. Then the several weights 14, 15, and 16 being adjusted, as indicated in Figs. 1 and 3, the apparatus is ready for use. It will be understood that the stationary frame is to be supported a suitable distance—say two feet—from the floor by means of legs or any other means, so that boxes or other receptacles for grain may be conveniently inserted beneath the weighing-hopper 1. The grain is allowed to descend in a continuous stream into the guard-hopper $f$ and passes through and overflows from the same into the receiving-hopper $e$, whence it discharges through the mouth $e'$ into that one of the compartments of the weighing-hopper 1 which is in line with the same—that is to say, in the position indicated in Figs. 1 and 4. So soon as the grain accumulates in such compartment to within twenty to forty pounds of the weight required the hopper 1 tilts on its pivots and through the medium of the toggle-bar 24 forces the lower lever 22 upward, and thereby allows the weighted elbow-levers 19 to swing the cut-off 17 part way beneath the discharge-orifice $e'$ of the receiving-hopper $e$. Besides this the front portion of the lever 22, through its connection with the weight-lever 31, tilts the latter until the same is arrested by contact of the beveled shoulder 35 of the stop-bar 34 with the antifriction-roller 36, as shown in Figs. 1 and 3. This lock or engagement of the stop-bar 34 holds the hopper fixed in the position to which it is tilted until the entire weight of grain has been received by the compartment being filled. As has been already stated, this final amount of twenty to forty pounds is received slowly, or as a dribble, by reason of the position assumed by the cut-off 17. When the hopper-compartment is duly filled, the weight of the grain therein becomes sufficient to tilt—that is, raise—the longer arm of the weighing-beam 13, and the lever 7 descending at this time its rigid arm 41 is carried down, and its bent lower end or toe-piece striking upon the projecting portion of the toggle-lever 37 (see Figs. 1 and 3) said lever is thrown up into position shown in Fig. 10 and the lock thereby released—that is to say, the stop-bar 34 is allowed to rise and the lever 31 to tilt, so that the cut-off lever 22 rises and the toggle-bar 24 is shifted to a vertical position and no longer opposes the tilting movement of the hopper 1. The latter then swings so as to bring the mouth of the loaded compartment over the discharge-orifice 43. In other words, the mouth of the loaded compartment moves off the valve 42, which previously closed it, and the mouth of the empty compartment passes over upon the opposite gate or valve 42, and the hopper 1 is thus placed in position to receive the new load. In this manner the operation proceeds continuously or without interruption of the flow of grain. It will be understood that when the lower lever 22 descends to its normal position it throws the weighted elbow-levers 19 back to their normal position, whereby the cut-off 17 is retracted to the position indicated in Fig. 4, and at the same time the toggle-bar 24 is set at the inclination or angle opposite to that which it had previously occupied, and thus serves to lock the hopper, as before.

Simultaneously with the completion of the tilting movement of the hopper the cut-off lever 22 operates the register 47, as has been already sufficiently described.

Having thus described our invention, what we claim as new, and desire to secure by Letters Patent, is—

1. In a weighing-machine, the combination, with a fixed supporting-frame, a movable lever-supported frame, a weighing-hopper pivoted in the latter, and a weighing-beam connected with the levers supporting said movable frame, of a lever, pivoted at one end below the said frame and extending alongside the lower portion of the hopper, and a device which pivotally connects such lever and the lower end of the hopper, and locks the latter in position for receiving a load, and then shifts to a new locking position when a portion of the load has been received by the hopper, substantially as shown and described.

2. In a weighing-machine, the combination, with a fixed supporting-frame, a weighing-beam, a tiltable weighing-hopper, and a supporting-frame for the latter, of a lever pivoted at one end to bars pendent from the hopper-supporting frame, and a toggle-bar, which is pivoted to both lever and hopper, and normally assumes an inclined position and supports the said lever until the load is received in the hopper, when it releases the latter, to allow discharge of the load, substantially as shown and described.

3. In a weighing-machine, the combination, with a tiltable, weighing-hopper, a frame in which it is suspended, a weighing-beam, and intermediate levers connected with said beam and hopper, of a lever pivotally connected with the hopper-supporting frame, a device attached to the lower end of the hopper and connected with the said lever at a point removed from its fulcrum, means for locking the said lever temporarily when raised to a certain position by a partial load in the hopper, and means connected with the weighing mechanism whereby the locking means is tripped when the full load is received in the hopper, and whereby the hopper is released and allowed to shift for discharging the load, substantially as shown and described.

4. In a weighing-machine, the combination, with a tiltable hopper, a frame in which it is hung, weighing-beam, and levers supporting the hopper and connected with said beam, of a lever, 22, pivotally connected at its fulcrum end with the hopper-supporting frame, a vertical slidable stop, and lever connected with the same, means for connecting said lever with the aforesaid lever 22, and a locking device connecting the latter with the hopper, said device being so arranged that the lever 22 is elevated when the hopper receives its load and the stop is released, substantially as shown and described.

5. In a weighing-machine, the combination with a weighing-beam, a tiltable weighing-hopper, and levers supporting the latter and connected with said beam, of devices connected with the lower portion of the hopper for locking it in position to receive a load, means operatively connecting such locking devices with the hopper-supporting levers, whereby said devices are tripped to allow automatic release of the hopper when loaded as shown and described.

6. In a weighing-machine, the combination, with the tiltable weighing-hopper, a frame in which said hopper is hung, the weighing-beam, and interposed levers connected with the latter and supporting the hopper, of a lever 22 pivotally connected with the hopper-supporting frame, toggle-bars pivoted to said lever and the lower portion of the hopper, and normally assuming an inclined position when the hopper is in position to receive the load, a vertical slidable bar provided with a shoulder, a fixed stop engaged by said shoulder, means for holding the said bar normally engaged with the stop, a lever pivotally connected with the bar and supporting the same, means for connecting such lever with the lever to which the toggle-bar is attached, and a device connected with the intermediate weighing-levers for tripping the locking-bar, to allow the hopper to shift when the load is complete, substantially as shown and described.

7. In a weighing-machine, the combination, with a tiltable weighing-hopper, weighing-beam, and levers suspending the hopper, of a stop-bar, and lever mechanism connecting it with the hopper, whereby the latter is held in normal position, a toggle-lever for holding said stop-bar in locking position, the said lever mechanism having a contact-piece suitably arranged for depressing the toggle-lever and forcing it back to place after the hopper has made its complete shifting movement, as shown and described.

8. In a weighing-machine, the combination, with the tiltable hopper, the weighing-beam, and weighing-levers interposed and supporting the hopper, of a slidable bar having a shoulder adapted to engage a fixed stop, a toggle-lever and a movable device to which said lever is attached for holding the locking-bar fixed in normal position, a lever to which said bar is pivoted and by which it is supported, means connecting said lever with the lower portion of the hopper whereby the latter is held locked in position to receive the load, and a trip device connected with the weighing mechanism, and which, when the hopper is loaded, descends and trips the toggle-lever and thereby releases the locking device, substantially as shown and described.

9. In a weighing-machine, the combination, with the tiltable weighing-hopper, a weighing-lever and interposed levers from which the hopper is suspended, of a lever 22 pivoted at one end, a toggle-bar, or lever, connecting the lever 22 with the lower portion of the hopper, whereby when the load is nearly sufficient the toggle is shifted and lever 22 is raised, a registering mechanism, and a lever connected therewith, and arranged in position to be acted upon when the said lever 22 is raised, substantially as shown and described.

10. In a weighing-machine, the combination, with a receiving-hopper, the weighing-hopper, the weighing-beam, and levers interposed between it and the weighing-hopper, and supporting the latter, of a cut-off for the receiving-hopper, means for suspending it whereby it is adapted to swing beneath the said hopper, weighted levers connected with the cut-off, a lever pivoted at one end and arranged adjacent to the lower portion of the hopper and a toggle-bar connecting said lever with the hopper, whereby the weighted levers are released and allowed to shift the cut-off beneath the discharge of the receiving-hopper when the weighing-hopper has received a portion of its load, substantially as shown and described.

11. In a weighing-machine, the combination, with a receiving-hopper, a tiltable weighing-hopper, a weighing-beam, and levers connected therewith and supporting the weighing-hopper, of a cut-off for the receiving-hopper which is adapted to swing under the latter, a lever 22 pivotally connected with the hopper by means of toggle-bars, and means connected with said lever 22 and serving to hold the cut-off retracted, the cut-off being released and allowed to swing automatically to reduce the flow of grain to a dribble when the load in the weighing-hopper becomes sufficient to depress it and thereby elevate the lever 22 in the manner shown and described.

12. In a weighing-machine, the combination, with the receiving-hopper, the weighing-hopper, the weighing-beam, and levers connected with the latter and supporting the said hopper, of a swinging cut-off for the receiving-hopper, a slidable bar connected therewith and provided with a series of holes to receive a stop-pin, and a bar arranged vertically for supporting said slidable bar and serving also as a stop, whereby the swinging movement of the cut-off is regulated in the manner shown and described.

13. In a weighing-machine, the combination, with a weighing-beam, a tiltable weighing-hopper, a frame in which the hopper is hung, and levers connected with said beam and suspending the hopper-frame, of swinging gates which are separated by a slot and arranged below the hopper for alternately closing the same and allowing discharge of its contents, and lugs attached to the hopper-supporting frame and adapted for arresting the gates, when the hopper makes its preliminary shifting movement, substantially as shown and described.

14. In a weighing-machine, the combination, with the weighing-hopper having a central partition dividing it into two compartments, and a weighing mechanism suspending the hopper as described, of shiftable gates arranged for alternately closing the compartments of the hopper and separated by a slot through which discharge of the hopper takes place, vertical bars and a walking-beam pivotally suspending the said gates, and means for arresting the movement of the latter after the hopper has made its preliminary shift, substantially as shown and described.

15. In a weighing-machine, the combination, with the weighing-hopper, the weighing-beam, and interposed levers from which the hopper is suspended, of gates for closing the mouth of the latter and curved upon the arc of a circle described from the pivot of said hopper, the latter being arranged in contiguity to, but out of contact with, the gates, cleaners consisting of transverse plates pivoted to the hopper and having extended arms, and spiral springs connected with said arms and serving to hold the cleaners in elastic contact with the gates, substantially as shown and described.

16. In a weighing-machine, the combination, with the receiving-hopper having a tapered and truncated lower portion, of the smaller guard-hopper arranged in the receiving-hopper and having a similar form, both hoppers having discharge-openings which are arranged in vertical alinement, and the guard-hopper being arranged below the upper edge of the receiving-hopper and separated from it by a considerable space, substantially as shown and described.

17. In a weighing-machine, a hanger or stirrup composed of two open loops having like form, one being larger than the other, whereby it is adapted to receive the same, the two being riveted together, and bearing-blocks supported in each end of the hanger and provided with depressions for receiving the pivotal bearings of the levers, substantially as shown and described.

18. In a weighing-machine, the combination with two sockets-bearings 10 10 spaced apart of the weighing-lever 13 having two conical fulcrum-pivots arranged opposite in the same horizontal plane and adapted to bear in such sockets and hold the beam in position without friction, said beam having also a pivot on the end of its shorter arm, and on the upper side of the latter, it being thus above the fulcrum-pivots, a stirrup 12 hung on such end pivot, a lever having a bearing in said stirrup, and a weighing-hopper connected with said lever, as shown and described.

ANGUS McLEOD.
JOHN H. McLEOD.

Witnesses:
J. WILEY POTTER,
M. C. BRAINARD.